United States Patent
Breitung et al.

(10) Patent No.: US 6,749,905 B1
(45) Date of Patent: Jun. 15, 2004

(54) METHOD FOR HOT STAMPING CHALCOGENIDE GLASS FOR INFRARED OPTICAL COMPONENTS

(75) Inventors: Eric Breitung, Albany, NY (US); John Reitz, Clifton Park, NY (US); George Dalakos, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/248,794

(22) Filed: Feb. 19, 2003

(51) Int. Cl.$^7$ ................................................. B05D 5/06
(52) U.S. Cl. ..................... 427/585; 427/162; 427/248.1; 427/255.18; 427/255.29; 427/370; 427/375; 427/595
(58) Field of Search ................................ 427/585, 162, 427/248.1, 255.18, 255.29, 370, 375, 595

(56) References Cited

U.S. PATENT DOCUMENTS

| | | | |
|---|---|---|---|
| 4,252,891 A | 2/1981 | Kostyshin et al. | 430/323 |
| 6,245,412 B1 | 6/2001 | Choquette et al. | 428/156 |
| 6,272,275 B1 | 8/2001 | Cortright et al. | 385/129 |
| 6,411,765 B1 | 6/2002 | Ono | 385/131 |

OTHER PUBLICATIONS

M. Asobe, T. Ohara, I. Yokohama and T. Kaino; "Low Power All–Optical Switching in a Nonlinear Optical Loop Mirror Using Chalcogenide Glass Fibre;" Electronic Letters, vol. 32, No. 15; Jul. 18, 1996; pp. 1396–1397.
K.A. Cerqua–Richardson, J.M. McKinley, B. Lawrence, S. Joshi, A. Villeneauve; "Comparison of Nonlinear Optical Properties of Sulfide Glasses in Bulk and Thin Film Form;" Optical Material 10; May 1998; pp. 155–159.
V. Balan, C. Vigreux, A. Pradel, M. Ribes; "Waveguides Based Upon Chalcogenide Glasses;" Electronics and Advanced Materials vol. 3, No. 2, Jun. 2001, p. 367–372.
M. S. Chang, T. W. Hou, J. T. Chen, K. D. Kolwicz, and J. N. Zemel; "Inorganic Resist for Dry Processing and Dopant Applications;" American Vacuum Society; 1980, pp. 1973–1976, (no month avail.).
M. N. Kozicki; S. W. Hsia; A.E. Owen; and P.J.S. Ewen; "Pass–a Chalcogenide–Base Lithography Scheme for I.C. Fabrication;" Journal of Non–Crystalline Solids 137 & 138; 1991; pp. 1341–1344, (no month avail.).
A. Yoshikawa, O. Ochi, and Y. Mizushima; "Dry Development of Se—Ge Inorganic Photoresist;" American Institue of Physics; 1980; pp. 107–109, (no month avail.).
R. G. Vadimsky; "Three–Dimensional Photolithography with Conformal GeSe Resist;" American Vacuum Society; 1988; pp. 2221–2223, (no month avail.).
N. Nordman and O. Nordman; "Characterization of Refractive Index Change Induced by Electron Irradiation in Amorphous Thin As2S3 Films;" American Institute of Physics; 1997; pp. 1521–1524, (no month avail.).
I. Szendro; "Art and Practice to Emboss Gratings into SOL–GEL Waveguides;" Proceeding of SPIE vol. 4284; 2001; pp. 80–87, (no month avail.).

(List continued on next page.)

Primary Examiner—Bernard Pianalto
(74) Attorney, Agent, or Firm—Cantor Colburn LLP

(57) ABSTRACT

A method for creating an optical structure includes forming a layer of chalcogenide material upon a substrate, and applying a patterned stamper to the layer of chalcogenide material, in the presence of heat, the patterned stamper causing the layer of chalcogenide material to reflow such that stamped features of the patterned stamper are transferred onto the layer of chalcogenide material. The stamped features onto the layer of chalcogenide material are used to form one of an optical waveguide, an optical mirror, digital video disk data, compact disk data and combinations comprising at least one of the foregoing.

17 Claims, 2 Drawing Sheets

OTHER PUBLICATIONS

K. H. Schlereth and H. Bottner; "Embossed Grating Lead Chalcogenide Distributed–Feedback Lasers;" American Vacuum Society; 1992; pp. 114–117, (no month avail.).

Z. Yu, S. J. Schabitsky, and S. Y. Chou; "Nanoscale GaAs Metal–Semiconductor–Metal Photodetectors Fabricated Using Nanoimprint Lithography;" Applied Physics Letters vol. 74, No. 16, Apr. 16, 1999; pp. 2381–2383.

http://irfibers.rutgers.edu—A Review of Infrared Fibers, (no date avail.).

METHOD FOR HOT STAMPING CHALCOGENIDE GLASS FOR INFRARED OPTICAL COMPONENTS

BACKGROUND OF THE INVENTION

The present disclosure relates generally to optical component fabrication and, more particularly, to a method for creating infrared optical components by hot stamping of chalcogenide glass.

Optical components are used to transmit and process light signals in various fields of technology, such as telecommunications, data communications, avionic control systems, sensor networks, and automotive control systems. Generally speaking, such optical components are classed as either passive or active. Examples of passive optical components are those that provide polarization control, transmission, distribution, splitting, combining, multiplexing, and demultiplexing of a light signal. Active optical components include those requiring electrical connections to power and/or control circuitry, such as laser sources and photodiode detectors, and/or to process light signals using electro-optic effects, such as provided by certain non-linear optical materials.

Infrared (IR) optical components (e.g., IR optical fibers) are components that have the capability of transmitting radiation wavelengths greater than about 2 microns.

Since the mid-1960's, efforts have been made to fabricate IR optical fibers with mechanical properties as close to silica as possible, but only a relatively small number have emerged as viable. Primarily, the use of IR fibers and waveguides has been limited to short-length applications requiring only tens of meters of fiber (e.g., sensing, laser power delivery), as opposed to the kilometer lengths of fiber common in the telecommunication industry.

In this regard, chalcogenide glasses have been utilized as IR optical waveguides, as these materials have good Infrared wavelength transparency, are durable, are easy to prepare in bulk or thin film form, can form optical fibers, and may be formed as patterned waveguides by photodarkening processes. Chalcogenides generally fall into three categories: sulfide, selenide, and telluride. One or more chalcogen elements are mixed with one or more elements such as As, Ge, P, Sb, Ga, Al, Si, etc. to form a two or more component glass. The ability to create chalcogenide thin films, by sputtering, for instance, allows for formation of a device using a chalcogenide glass as part of a larger semiconductor integrated package. Heretofore, such inorganic materials used in photonics applications have deposited as thin films and thereafter processed in accordance with conventional semiconductor photolithography and etching (RIE) techniques to shape the appropriate features. Unfortunately, this process is time consuming and involves multiple steps such as precoating with a photopolymer, masking, irradiating the polymer through the mask, etching, and dissolving of any unused mask. Thus, it would be advantageous to be able to create IR optical devices having the desired micron to nano-sized features in a quicker, less expensive fashion.

BRIEF DESCRIPTION OF THE INVENTION

The above discussed and other drawbacks and deficiencies of the prior art are overcome or alleviated by a method for creating an optical structure. In an exemplary embodiment, the method includes forming a layer of chalcogenide material upon a substrate, and applying a patterned stamper to the layer of chalcogenide material, in the presence of heat, the patterned stamper causing the layer of chalcogenide material to reflow such that the stamped features of the patterned stamper are transferred onto the layer of chalcogenide material. The stamped features onto the layer of chalcogenide material are used to form one of an optical waveguide, an optical mirror, digital video disk data, compact disk data and combinations comprising at least one of the foregoing.

In another aspect, a method for creating an infrared optical structure includes forming a layer of chalcogenide material upon a substrate and positioning the substrate and a patterned stamper within an embossing apparatus. The substrate, patterned stamper and embossing apparatus are heated, and the embossing apparatus is then engaged so as to apply the patterned stamper to the layer of chalcogenide material. The layer of chalcogenide material is caused to reflow such that the stamped features of the patterned stamper are transferred onto the layer of chalcogenide material. The stamped features onto the layer of chalcogenide material are used to form one of an optical waveguide, an optical mirror, digital video disk data, compact disk data and combinations comprising at least one of the foregoing.

BRIEF DESCRIPTION OF THE DRAWINGS

Referring to the exemplary drawings wherein like elements are numbered alike in the several Figures.

DETAILED DESCRIPTION OF THE INVENTION

Disclosed herein is a method and apparatus for creating an IR transparent, optical component (e.g., a waveguide structure) by embossing or "hot-stamping" a layer of chalcogenide glass, thereby transferring a desired pattern of nanometer to micron-sized features Into the chalcogenide film. Such features include those used In applications/devices such as, for example, micro-optics, flexible waveguides, high density optical Interconnects, optical waveguides and mirrors, digital video disk (DVD) and compact disk (CD) data, and other anti-reflective facets on surfaces.

Figure 1:
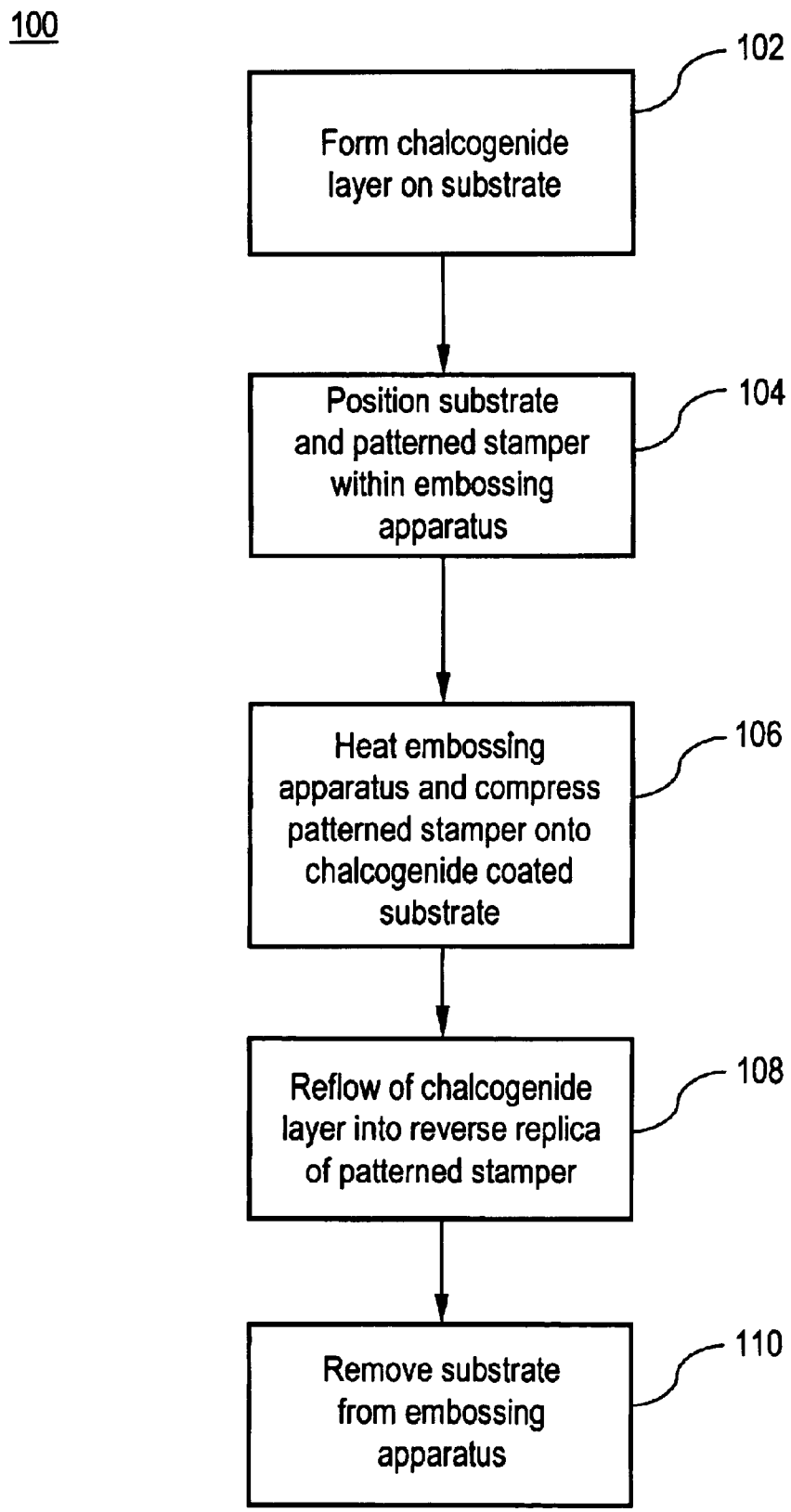
FIG. 1 is a block diagram of a method for creating an optical waveguide structure, in accordance-with an embodiment of the invention.

Referring to FIG. 1, there is shown a block diagram of a method 100 for creating an optical waveguide structure, in accordance with an embodiment of the invention. As shown in block 102, a chalcogenide layer is formed upon a substrate. More particularly, a certain thickness of chalcogenide material (e.g., about 0.1 to about 20 microns) is deposited upon a substrate material such as plastic, silicon, silicon dioxide, oxidized silicon, or any other appropriate material, through any conventional technique known to those skilled in the art. Examples of such suitable techniques include, but are not limited to electron beam evaporation, thermal evaporation, thermal chemical vapor deposition (CVD), plasma enhanced CVD (PECVD), or sputtering. Then, as shown in block 104, the chalcogenide-coated substrate is positioned upon a smooth, flat base within an embossing apparatus (as described in further detail hereinafter), along with a patterned stamper having desired optical features to be transferred on to the chalcogenide layer. The stamper may be made of a material such as silicon, nickel, a polymer or other suitable material in which the desired nano/micro features may be formed.

Once positioned, the patterned stamper is brought into compressing engagement with the chalcogenide-coated substrate in the presence of heat (block 106), thereby resulting in a reflow of the chalcogenide glass into a reverse replica of the patterned stamper (block 108). The substrate is thereafter removed from the embossing apparatus (block 110) and, in the event that certain isolated features on the glass are desired, post-etching may be used to remove unwanted material thereon.

The particular type of embossing equipment used may provide a rigid (i.e., "hard") pressing force upon the coated substrate or, alternatively, a "soft" pressing force through an air-filled pressure cavity located behind the patterned stamper. Alternative embodiments of an exemplary embossing apparatus 200 are illustrated in FIGS. 2 and 3.

Figure 2:
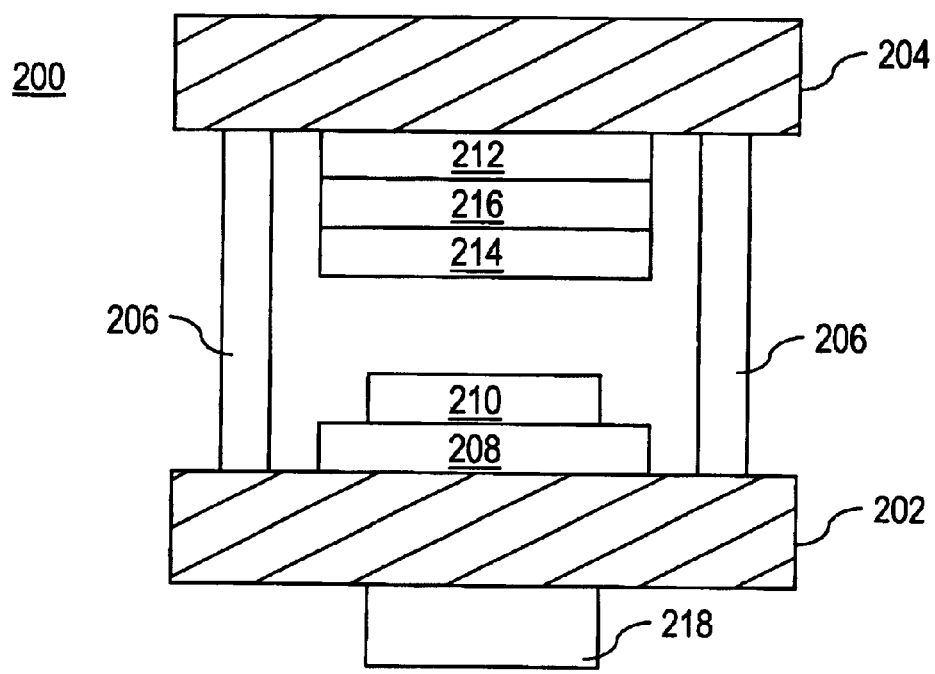
FIG. 2 is a schematic diagram of an exemplary embossing apparatus that may be utilized in implementing the method outlined in FIG. 1.
Figure 3:
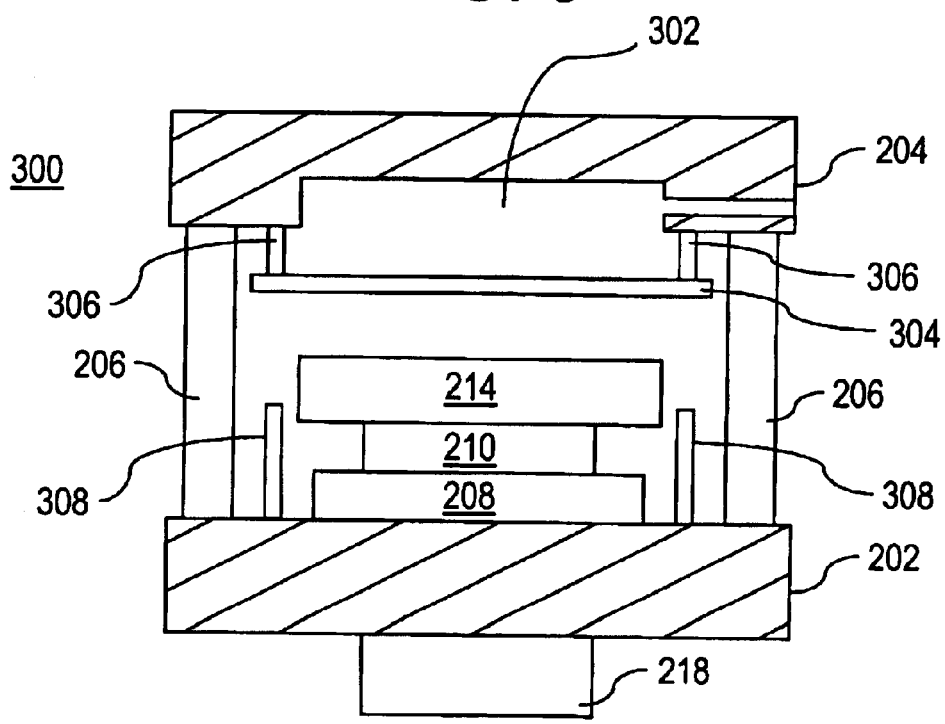
FIG. 3 is a schematic diagram of an alternative embodiment of the apparatus shown in FIG. 2.

As shown in FIG. 2, a "rigid press" embossing apparatus 200 includes a pair of opposing heated platens 202, 204 that are set apart from one another by a pair of alignment rods 206. Located upon the lower platen 202 is a flat, mirrored block 208 comprising (for example) a block of aluminum oxide, onto which the chalcogenidecoated substrate 210 is placed. In a similar manner, the upper platen 204 also includes a flat, mirrored block 212 attached thereto for mounting of the patterned stamper 214. In addition, at least one compliant layer 216 is interposed between the upper platen 204 and the patterned stamper as a result of the relatively high compressive force provided by hydraulic (or electric) piston 218 in moving the lower and upper platens 202, 204 toward one another to compress the stamper 214 into the coated substrate 210.

One potential drawback in utilizing a rigid press lamination apparatus is that the machined tolerances are typically not as good as may be desired. That is, the applied pressure across the entire surface of the stamper/substrate interface may be uneven so as to result in inconsistent feature depths. Moreover, the use of higher pressures can stress or even crack the patterned stamper 214, as well as the apparatus itself. Accordingly, FIG. 3 illustrates an alternative apparatus 300, in which a "soft press" is used to perform the hot stamping. In this embodiment, the piston 218 is a hydraulic piston for providing a low-level clamping force.

In lieu of a flat block on the upper platen, a pressure cavity 302 is used to provide air pressure behind the stamper for desired compliance. The cavity 302 is covered by a polyimide sheet (such as Kapton® Polyimide Film, manufactured by the Du Pont Company, for example), which serves as a pressure bladder 304. Other materials, however, may also be used. In addition, clamping rings 306, 308 are provided for sealing and spacing. Air pressure is applied to the backside of the pressure bladder 304 from the cavity 302 such that the applied pressure is used to assist in the reflow of the chalcogenide glass into an exact, reversed replica of the patterned stamper 214.

EXAMPLES

An apparatus similar to the schematic of FIG. 3 was used to test the stamping process described above by stamping both DVD information (i.e., nano-sized features) and optical waveguides (i.e., micron sized features) into $As_xSe_y$ chalgogenide material on a $SiO_2/Si$ wafer substrate disposed within the hot press. In each experiment, the press, bladder (Kapton®), stamper, coated substrate and base were heated to a temperature of about 140 to about 190 degrees Celsius. A pressure of at least about 30 psi, and preferably on the order of about 80 psi, was applied to the backside of the bladder prior to the stamping operation. Upon reflow of the chalgogenide material into a replica of the stamper, the substrate was removed with the assistance of a nickel removal layer applied to the stamper. Other removal materials, however, may also be used in this regard, such as amorphous carbon, gold and silicon. In each case, the patterned features were successfully transferred into the chalgogenide material.

As will be appreciated, the present disclosure provides for three-dimensional micron sized and nanometer sized features to be transferred to a chalcogenide glass formed on a substrate. The particular chalcogenide used is very transparent in the infrared portion of the electromagnetic spectrum, and is therefore useful for optical communications devices where wavelengths in the infrared are used. It is contemplated that other chalcogenides (such as selenides and tellurides, along with any of the other mixing elements described above, such as germanium, phosphorus, antimony, gallium, aluminum, silicon, and combinations thereof) may work just as well in both the stamping and transparency arenas. It will further be appreciated that a waveguide structure is just one example of a possible structure that may be formed in accordance with the above process. The process is applicable to any three dimensional structure such as, for example, 45 degree mirror.

The stamping process described herein results in fewer steps and less capital expenditure for equipment, as would be the case for RIE produced features. Furthermore, hot stamping is faster and cheaper than conventional processing of similar materials. The chalcogenide materials used are stable, as is the case with other types of inorganics, but further have the advantage of quicker processing in view of organic materials used for similar applications. Organic materials, on the other hand, are generally less stable over time than inorganic materials.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for creating an optical structure, the method comprising:

forming a layer of chalcogenide material upon a substrate; and applying a patterned stamper to said layer of chalcogenide material, in the presence of heat, said patterned stamper thereby causing said layer of chalcogenide material to reflow such that stamped features of said patterned stamper are transferred onto said layer of chalcogenide material;

wherein said stamped features onto said layer of chalcogenide material are used to form one of: an optical waveguide, an optical mirror, digital video disk data, compact disk data and combinations comprising at least one of the foregoing.

2. The method of claim 1, wherein said patterned stamper includes nanoscale features formed thereupon.

3. The method of claim 1, wherein said layer of chalcogenide material is deposited upon said substrate at a thickness of about 0.1 microns to about 20 microns.

4. The method of claim 3, wherein said layer of chalcogenide material is deposited by one of: e-beam evaporation, thermal evaporation, thermal CVD, and PECVD.

5. The method of claim 1, wherein said substrate further comprises one of: plastic, silicon, silicon dioxide, and oxidized silicon.

6. The method of claim 1, wherein said patterned stamper includes a nickel removal layer formed thereupon.

7. The method of claim 1, wherein said chalcogenide material is of the composition $As_xSe_y$.

8. A method for creating an infrared optical structure, the method comprising:

forming a layer of chalcogenide material upon a substrate;

positioning said substrate and a patterned stamper within an embossing apparatus;

heating said substrate, said patterned stamper and said embossing apparatus; and engaging said embossing apparatus so as to apply said patterned stamper to said layer of chalcogenide material, said patterned stamper causing said layer of chalcogenide material to reflow such that stamped features of said patterned stamper are transferred onto said layer of chalcogenide material;

wherein said stamped features onto said layer of chalcogenide material are used to form one of: an optical waveguide, an optical mirror, digital video disk data, compact disk data and combinations comprising at least one of the foregoing.

9. The method of claim 8, wherein said patterned stamper includes nanoscale features formed thereupon.

10. The method of claim 8, wherein said layer of chalcogenide material is deposited upon said substrate at a thickness of about 0.1 microns to about 20 microns.

11. The method of claim 10, wherein said layer of chalcogenide material is deposited by one of: e-beam evaporation, thermal evaporation, thermal CVD, and PECVD.

12. The method of claim 8, wherein said substrate further comprises one of: plastic, silicon, silicon dioxide, and oxidized silicon.

13. The method of claim 8, wherein said patterned stamper includes a nickel removal layer formed thereupon.

14. The method of claim 8, further comprising applying air pressure behind a bladder configured within said embossing apparatus, said bladder being in engagement with said patterned stamper.

15. The method of claim 14, wherein said air pressure is applied at about 30 psi to about 80 psi.

16. The method of claim 8, wherein said substrate, said patterned stamper and said embossing apparatus are heated to a temperature of about 140 degrees Celsius to about 190 degrees Celsius.

17. The method of claim 8, wherein said chalcogenide material is of the composition $As_xSe_y$.

* * * * *